United States Patent
Testroet et al.

(10) Patent No.: US 6,547,440 B2
(45) Date of Patent: Apr. 15, 2003

(54) FORWARD BEARING ARRANGEMENT FOR THE TILTING CAB OF A TRUCK

(75) Inventors: Martin Testroet, Sankt Augustin (DE); Ralf Steinhöfer, Königswinter (DE)

(73) Assignee: Mannesmann Boge GmbH, Bonn (DE)

( * ) Notice: Subject to any disclaimer, the term of this patent is extended or adjusted under 35 U.S.C. 154(b) by 0 days.

(21) Appl. No.: 09/943,666

(22) Filed: Aug. 31, 2001

(65) Prior Publication Data

US 2002/0028031 A1 Mar. 7, 2002

(30) Foreign Application Priority Data

Sep. 1, 2000 (DE) .......................... 100 43 048

(51) Int. Cl.[7] .................. F16C 27/02; B62D 33/067
(52) U.S. Cl. .................. 384/215; 384/222; 180/89.14
(58) Field of Search .................. 384/215, 217, 384/220, 221, 222; 180/89.14

(56) References Cited

U.S. PATENT DOCUMENTS

| 4,491,429 A | * | 1/1985 | Matoba et al. .............. 384/222 |
| 4,671,678 A | * | 6/1987 | Munch ......................... 384/222 |
| 4,744,677 A | * | 5/1988 | Tamaka et al. .............. 384/222 |
| 5,024,283 A | * | 6/1991 | Deli .......................... 180/89.14 |
| 5,957,231 A | * | 9/1999 | Conaway et al. ........ 180/89.14 |

FOREIGN PATENT DOCUMENTS

| DE | 3519868 A1 | * | 12/1986 |
| DE | 195 37 722 | | 4/1997 |
| EP | 0 635 419 | | 1/1995 |
| EP | 0636532 A1 | * | 2/1995 |

* cited by examiner

Primary Examiner—Thomas R. Hannon
(74) Attorney, Agent, or Firm—Cohen, Pontani, Lieberman & Pavane

(57) ABSTRACT

The cab is supported at the front by elastic bearings mounted on bearing axles in alignment with each other and supported by at least two brackets attached to the vehicle frame. The elastic bearings are mounted in bearing shells attached to the floor of the cab. Each elastic bearing includes a rubber bearing with a plain bearing coaxial to it. An arresting device between the plain bearing and the elastic bearing presents relative rotation until a threshold torsional load is exceeded.

8 Claims, 3 Drawing Sheets

FORWARD BEARING ARRANGEMENT FOR THE TILTING CAB OF A TRUCK

BACKGROUND OF THE INVENTION

1. Field of the Invention

The invention pertains to a forward bearing arrangement for the tilting cab of a truck, with at least two brackets fastened to the vehicle frame, on which the cab is supported at the front by way of elastic bearings mounted on bearing axles which are aligned with each other, which bearings are mounted in bearing shells fastened to the floor of the cab.

2. Description of the Related Art

Bearing arrangements for tilting cabs of trucks are already known (e.g., DE 195 37 722 A1, EP 0 635 419 B1). A bearing arrangement of this type is based on the following problems: To achieve a sufficiently comfortable ride, the cab bearings must allow the longest possible distances, but these are predetermined by the design and by the material of the elastic bearings. Relatively soft elastic bearings, which allow relatively large spring excursion, however, turn out to be disadvantageous when the cab is tilted.

In the bearings of the tilting cab of a truck, various loads, i.e., functionally superimposed loads, are always to be expected at the forward bearing points. While the vehicle is being driven, torsional loads of approximately ±10° occur, upon which radial and axial loads are superimposed. When necessary, however, the cab must also be tilted at the same bearing points, in which case a torsional load of approximately 70° must be handled. In addition, there are also cardanic loads.

Pure plain bearings have not proven to be sufficiently long-lived at this installation point, because the continually alternating loads in a relatively small area of the bearing (point load), which area is always the same, leads to premature wear, even when the bearings are designed to be greased. In addition, plain bearings are difficult and expensive to produce because of the very close manufacturing tolerances, and they do not have any damping properties at all. Because plain bearings have no elasticity, furthermore, high edge pressures also occur under cardanic load.

SUMMARY OF THE INVENTION

It is therefore the object of the invention to design a forward bearing arrangement for a tilting cab in such a way that the elastic bearings provide a comfortable spring suspension of the cab but at the same time allow the cab to be tilted easily.

To achieve this object, in accordance with the invention the bearing includes a rubber bearing with a plain bearing coaxial to it. It is advantageous here that the customers' requirements for comfort during operation of the vehicle, for a long service life (vehicle life), and simultaneously for favorable torsional properties when the cab is tilted are all accommodated when the forward bearing arrangement consists of this combination of a rubber bearing and a plain bearing.

It is also advantageous that the functions of this type of bearing are separated between driving and tilting, which gives the bearing superior properties in each category. In terms of vehicle operation, the use of a rubber bearing satisfies to the highest degree the customers' requirements for freedom from maintenance, long service life, economy, and a comfortable ride, whereas, when the cab is tilted, the plain bearing is able to handle by itself the rotational movements of approximately 70° and must therefore do no more than withstand the required number of load cycles of 1,500 tilts.

In accordance with another essential feature of the invention, it is provided that the rubber bearing is mounted on the bearing axle and the plain bearing is mounted between the rubber bearing and the bearing shell radially on the outside. Because the two different functions are separated, both the rubber bearing and the plain bearing can be designed at low cost to meet the minimum appropriate requirements.

In accordance with another essential feature, an arresting device is provided to prevent the plain bearing from rotating. By means of an arresting device of this type, it is therefore possible to "deactivate" the plain bearing, as it were, while the vehicle is being driven.

It is also provided that the arresting device is under pretension and allows the plain bearing to rotate once a certain predetermined force is exceeded. As an arresting device, the plain bearing has at least one recess in the outside circumference, in which a spring-loaded element engages. It is advantageous for this element to be ball.

An arresting device of this type with spring-loaded elements on the outside circumference of the outer part of the rubber bearing which latch in a positive, form-locking manner has the effect of deactivating the plain bearing, which is on the outside. While the truck is being driven, the spring-loaded elements arrest rotation of the plain bearing relative to the rubber bearing and thus transmit all of the torsional movements introduced up to a certain defined torsion angle to the rubber bearing in a positive, form-locking manner. The main loads during driving, namely, the torsional loads of approximately ±10°, upon which radial and axial loads are superimposed, as well as the allowable manufacturing tolerances are absorbed by the maintenance-free rubber bearing.

The larger torsion angles associated with the tilting of the cab lead to the unlatching of the elastic elements from their recesses and thus to the activation of the plain bearing. From this moment, the rubber bearing is free of torsional load, and the spring-loaded elements now slide over the circumference of the outer bearing part. The following torsional movement is then handled exclusively by a maintenance-free plain bearing, with a contact layer consisting of, for example, a PTFE component (without lubrication). Thus the plain bearing is under load only when the cab is tilted and not while the truck is being driven, which means that service life problems in this area can be excluded.

According to another embodiment, it is provided that each ball is located together with a compression spring in a bore in a screwed-in part.

According to an advantageous embodiment, it is provided that the rubber bearing consists of an inner bush and an outer bush with a rubber element between them. Readily available, standard rubber bearings of this type can be used; the only point requiring attention is the coordination of the diameters of the two bearings to each other, which should present no difficulty.

In accordance with another design, it is provided that the rubber bearing and the plain bearing are held in place in a bore in the bearing shell by at least one lock washer.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
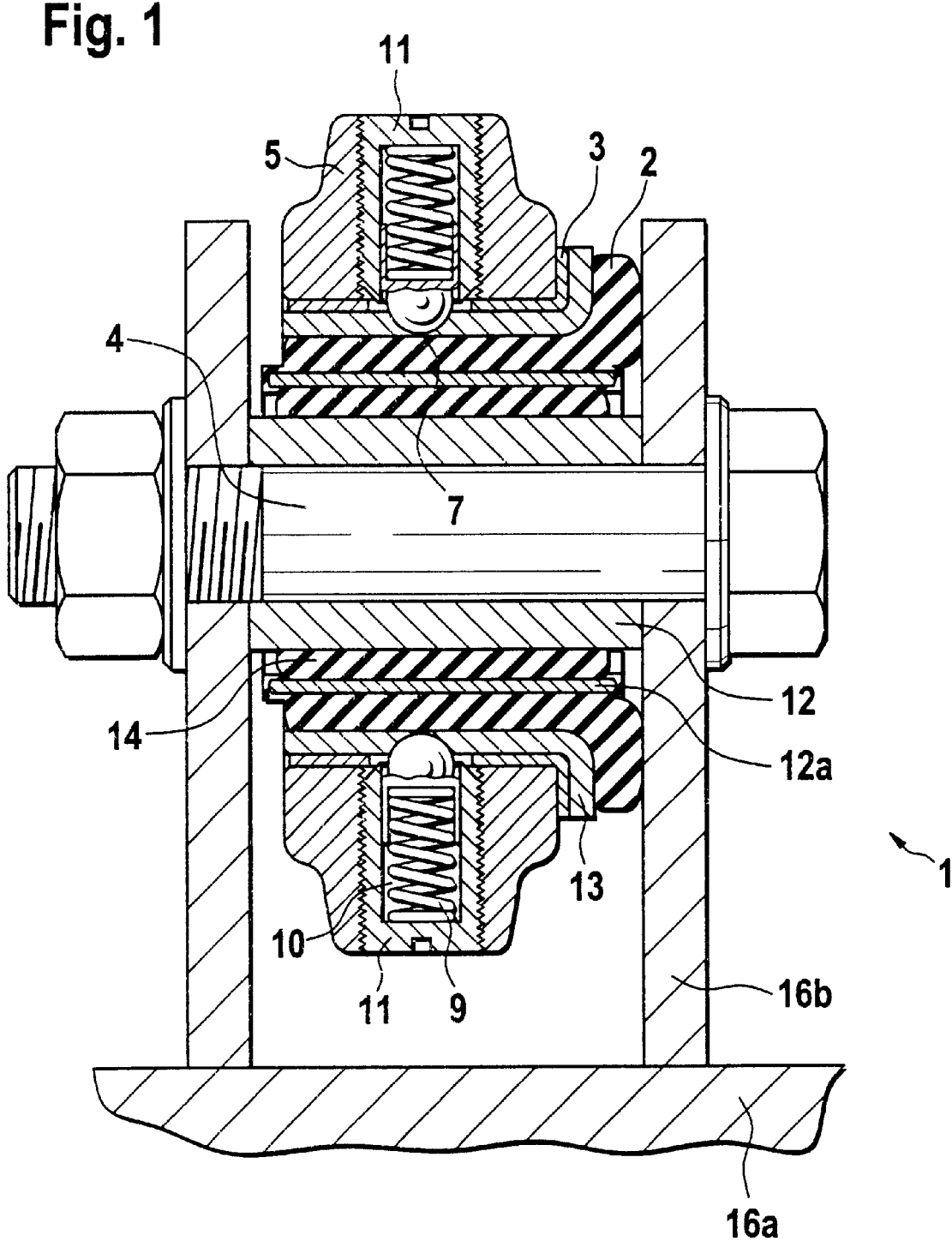
FIG. 1 is a sectional view of a bearing arrangement.
Figure 2:
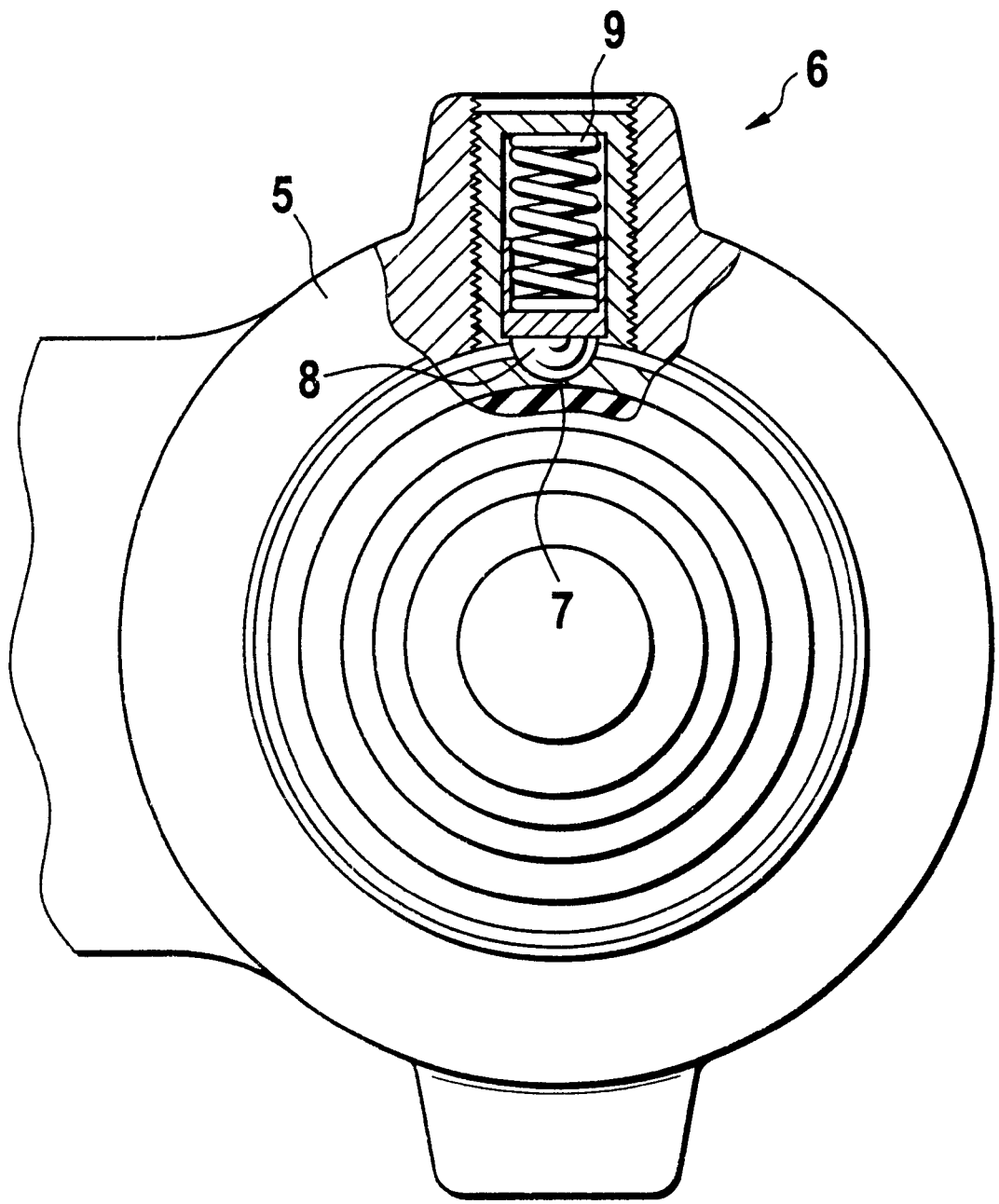
FIG. 2 is a side view of the bearing arrangement of FIG. 1.

The forward bearing arrangement shown in FIGS. 1 and 2 for the tilting cab of a truck consists essentially of the bearing brackets 16a, 16b; the bearing axle 4, on which the bearing 1 is mounted; and the bearing shell 5, which is fixed to the floor of the cab in a manner not shown in the drawings.

The bearing 1 itself consists of a rubber bearing 2, a plain bearing 3, and an arresting device 6. The rubber bearing 2, which is radially on the inside, is mounted on the bearing axle 4; it has an inner bush 12, an outer bush 13, and a rubber part 14 between them. Radially outside the rubber bearing 2 is the plain bearing 3, in which there is a hole 7, by means of which a ball 8 can produce a positive connection with the outer bush 13 of the rubber bearing 2.

The arresting device 6 consists here of a screwed-in part 11 with a bore 10, in which not only the ball 8 but also a spring 9 are housed, so that, when the cab is tilted beyond a certain point, the ball 8 releases the form-locking connection and allows the plain bearing 3 to turn relative to the rubber bearing 2. The rubber bearing 2 rotates to only an insignificant degree relative to the bearing axle 4.

Figure 3:
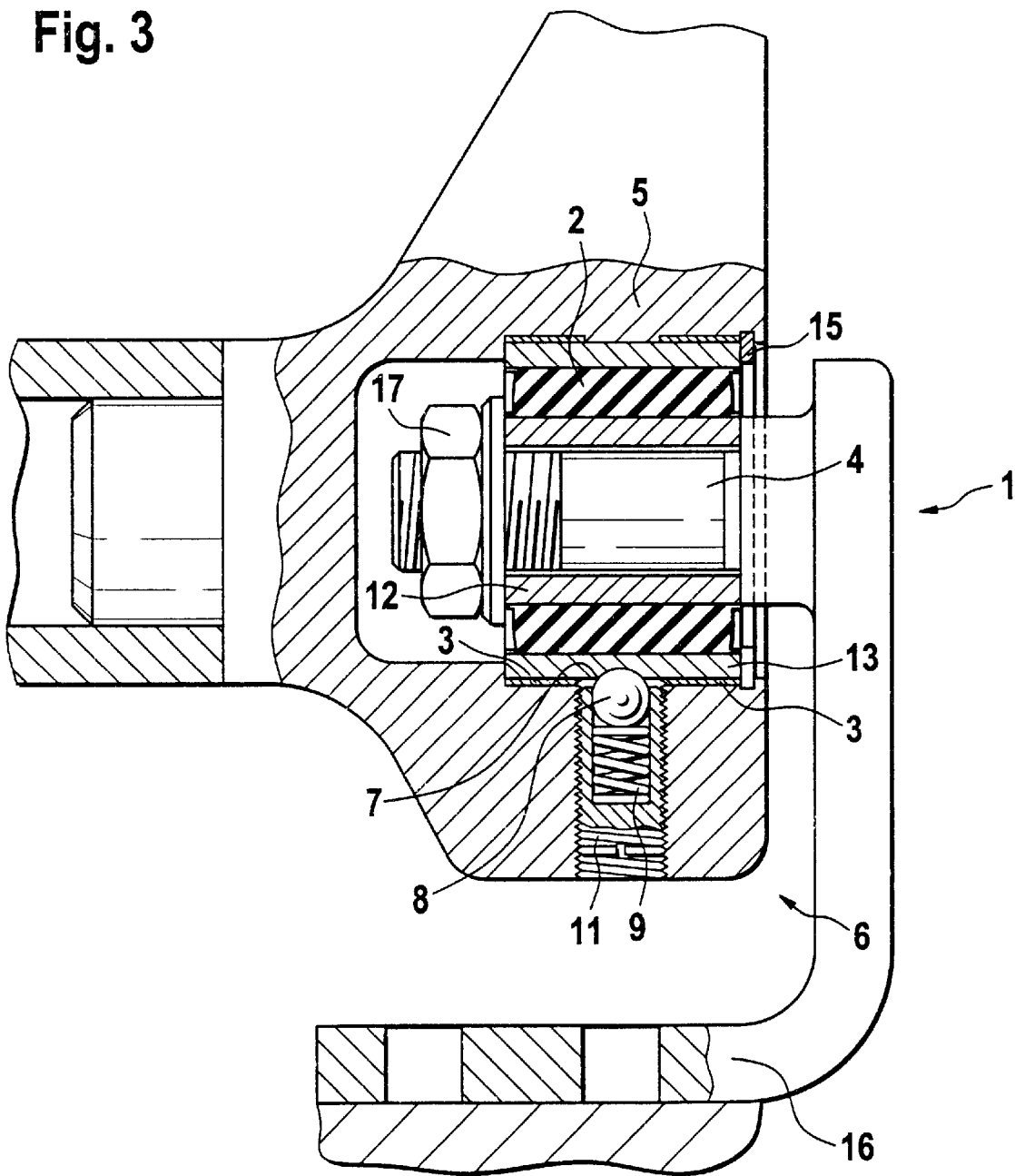
FIG. 3 is a sectional view of another embodiment of a bearing arrangement.

FIG. 3 shows another design, in which the bearing bracket 16, which is connected to the chassis of the truck, also comprises the bearing axle 4 at the same time. The bearing shell 5 is connected to the cab. The rubber bearing 2 is mounted on the bearing axis 4, and the plain bearing 3 is located radially outside the rubber bearing 2. The entire bearing 1 is fastened by a lock nut 17 to the bearing axis 14, whereas the bearing 1 is held in the bearing shell by means of a lock washer 15.

In this design, too, an arresting device 6 is provided, consisting of a screwed-in part 11, a spring 9, and a spring-loaded element in the form of a ball 8. The ball 8 fits through a hole 7 in the plain bearing and engages with a recess in the outer bush 13 of the rubber bearing 2 to produce a form-locking connection.

Larger torsion angles, caused by the tilting of the cab, lead to the release of the ball 8 from the outer bush 13. The rubber bearing 2 is thus free from this moment on of torsional loads, and the plain bearing is now able to perform its function. While the cab is being tilted, the balls slide along the circumference of the outer bush 13, so that the torsional movement is executed only by the maintenance-free plain bearing 3.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A forward bearing arrangement for tilting the cab of a truck relative to the frame of the truck, said arrangement comprising
   at least two brackets attached to the frame of the truck,
   at least two bearing axles mounted to said brackets and aligned with each other,
   an elastic bearing mounted on each of said bearing axles, each of said elastic bearings comprising a rubber bearing and a plain bearing which is coaxial to said rubber bearing, and
   at least two bearing shells fixed to the cab, each said elastic bearing being held in a respective said bearing shell, each said rubber bearing being mounted on a respective said bearing axle, each said plain bearing being mounted between the rubber bearing and the bearing shell.

2. A bearing arrangement as in claim 1 further comprising an arresting device which prevents said plain bearing from rotating relative to said rubber bearing.

3. A bearing arrangement as in claim 2 wherein said arresting device allows the plain bearing to rotate relative to the rubber bearing when a threshold torsional load is exceeded.

4. A bearing arrangement as in claim 2 wherein said plain bearing has an outer circumference with a hole, said arresting device being mounted on said outer circumference and having a spring loaded element received in said hole.

5. A bearing arrangement as in claim 4 wherein said spring loaded element is a ball.

6. A bearing arrangement as in claim 5 wherein said arresting device comprises a screwed in part received in said bearing shell, said screwed in part having a bore with a compression spring which loads said ball toward though said hole toward said rubber bearing.

7. A bearing arrangement as in claim 1 wherein said rubber bearing comprises an inner bush, an outer bush, and a rubber element therebetween.

8. A bearing arrangement as in claim 1 wherein said bearing shell comprises a bore, said elastic bearing being held in said bore by at least one lock washer.

* * * * *